(12) United States Patent
Moisanen et al.

(10) Patent No.: US 9,161,221 B2
(45) Date of Patent: Oct. 13, 2015

(54) METHOD, APPARATUS AND COMPUTER PROGRAM FOR OPERATING A USER EQUIPMENT

(71) Applicant: Broadcom Corporation, Irvine, CA (US)

(72) Inventors: Matti Tapani Moisanen, Oulu (FI); Marko Tapani Akselin, Oulu (FI); Marko Tapani Niemi, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/231,831

(22) Filed: Apr. 1, 2014

(65) Prior Publication Data

US 2014/0295797 A1   Oct. 2, 2014

(30) Foreign Application Priority Data

Apr. 2, 2013 (GB) .................................. 1305892.0

(51) Int. Cl.
| | |
|---|---|
| *H04W 88/02* | (2009.01) |
| *H04W 12/12* | (2009.01) |
| *H04W 12/08* | (2009.01) |
| *H04W 12/06* | (2009.01) |
| H04W 88/06 | (2009.01) |

(52) U.S. Cl.
CPC .............. *H04W 12/06* (2013.01); *H04W 88/06* (2013.01)

(58) Field of Classification Search
CPC ..... H04W 88/02; H04W 12/12; H04W 12/08; H04W 12/06; H04L 63/08

USPC ......................................................... 455/411
See application file for complete search history.

(56) References Cited

U.S. PATENT DOCUMENTS

2010/0054472 A1\* 3/2010 Barany et al. ................. 380/270

FOREIGN PATENT DOCUMENTS

| EP | 2007162 | 12/2008 |
|---|---|---|
| EP | 2007162 A2 \* | 12/2008 |
| GB | 2479578 | 4/2010 |
| WO | 2009051405 | 4/2009 |

OTHER PUBLICATIONS

3GPP TS 33.401 V12.7.0 (Mar. 2013)Technical Specification Group Services and System Aspects;3GPP System Architecture Evolution (SAE); Security architecture;Release 12; (121 pages).
3GPP TS 33.102 v11.5.0;(Dec. 2012)Technical Specification Group Services and System Aspects; 3G Security; Security architecture ;Release 11; (76 pages).

\* cited by examiner

*Primary Examiner* — Kashif Siddiqui
*Assistant Examiner* — Obidon Bassinan
(74) *Attorney, Agent, or Firm* — Oblon, McClelland, Maier & Neustadt, L.L.P.

(57) ABSTRACT

Embodiments provide a method, apparatus and computer program for operating a user equipment (UE). The method begins by determining that a valid authentication for the UE, generated with a radio network operating with a first radio access technology (RAT), is not a mutual authentication between the UE and the network operating with the first RAT. In response, the UE unilaterally takes action to prevent the valid authentication that is not a mutual authentication from being used to authenticate with a radio network operating with a second RAT that utilizes mutual authentication.

20 Claims, 2 Drawing Sheets

METHOD, APPARATUS AND COMPUTER PROGRAM FOR OPERATING A USER EQUIPMENT

TECHNICAL FIELD

The present invention relates to a method, apparatus and a computer program for operating a user equipment. The exemplary and non-limiting embodiments of this invention relate generally to wireless communication systems, methods, devices and computer programs and specific embodiments relate to ensuring appropriate security context or other type of authentication between a user equipment and a network despite that a valid security context established in one radio access technology (RAT) for a user equipment (UE) is conventionally re-used when the UE moves to a different RAT.

BACKGROUND

The various cellular type radio access technologies typically establish some security between the network and the mobile device (more generically referred to as a user equipment or UE) to better ensure that a) only authorized UEs utilize the resources of a given network, and b) the network that the UE accesses is a preferred network when more than one network is available. In the Third Generation Partnership Project (3GPP) radio access technologies (RATs), information security is based on an authentication procedure such as for example an Authentication and Key Agreement (AKA; for background see 3GPP TS 33.102 v11.5.0, December 2012). The AKA procedure produces security keys, also known in the wireless arts as a security context, which are used in confidentiality and data integrity procedures in the UE and in the network.

Global System for Mobile Communications (GSM) provides for an authentication procedure that results in the establishment of a GSM security context which helps protect the network against unauthorized use and also helps protect the GSM public land mobile network (PLMN) subscribers by denying the possibility for intruders to impersonate authorized users. The GSM authentication procedure only authenticates the UE; that is, the GSM authentication procedure does not provide a means for the UE to authenticate the network that initiated the authentication procedure.

The inventors have identified a security "hole" in which a security context established using the GSM authentication procedure can be used as the basis for establishing security in a different RAT whose native security protocol would establish a mutual authentication between the UE and the network. Mutual authentication between a UE and a wireless network means that the UE authenticates the network and the network authenticates the UE. More generally, these teachings prevent a UE's context established in one RAT from being be re-used in another RAT for the case in which the earlier-established security context is not sufficiently secure for the other RAT.

DETAILED DESCRIPTION

Figure 1:
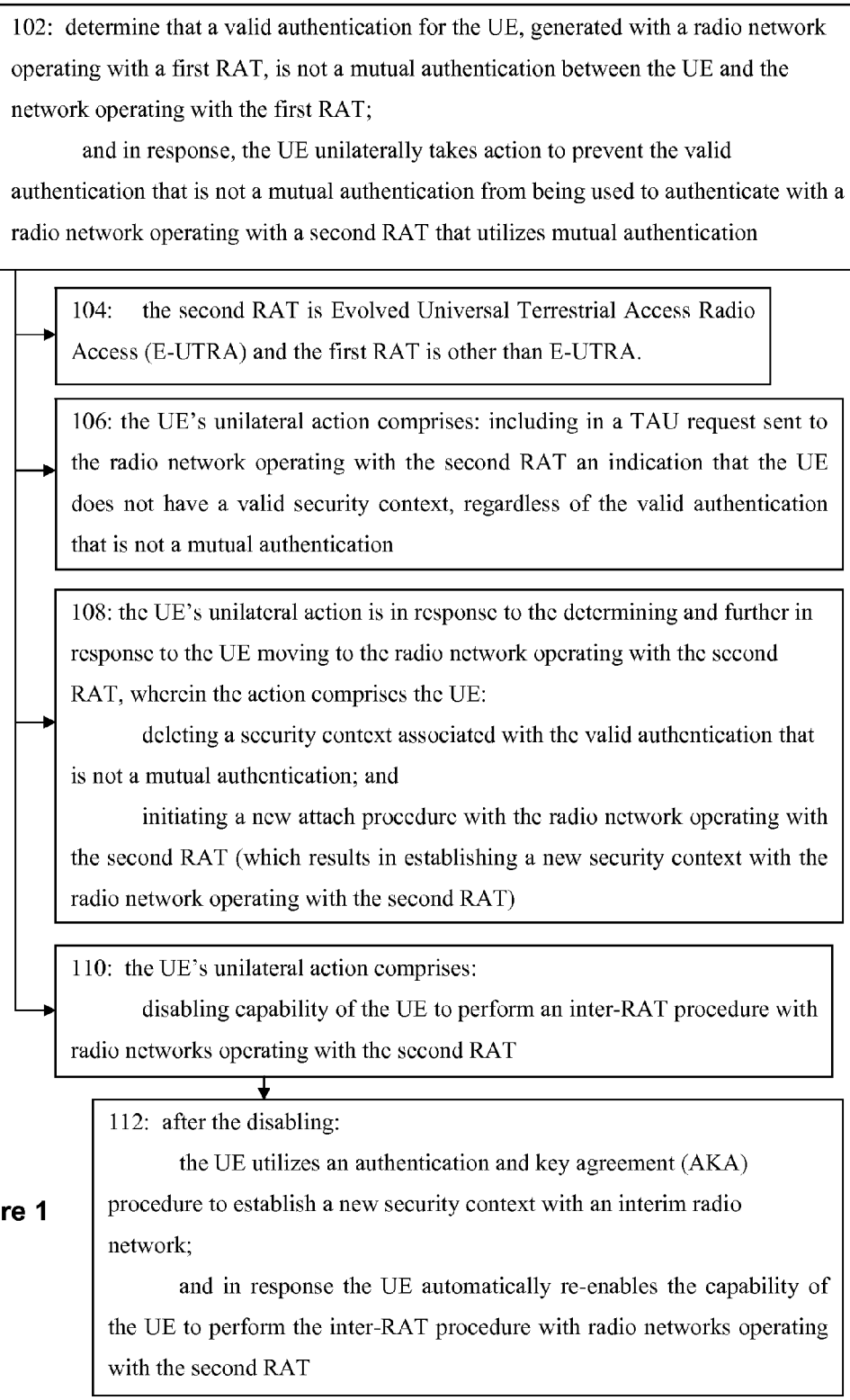
FIG. 1 is a logic flow diagram that illustrates the operation of examples of a method, a result of execution of by apparatus, and execution of computer instructions comprising code embodied on a computer readable memory, in accordance with the exemplary embodiments of this invention.

The examples detailed herein are in the context of a UE moving from a radio network operating with the GSM RAT to a radio network operating according to the Evolved Universal Terrestrial Radio Access (E-UTRA, sometimes referred to as Long Term Evolution or LTE) RAT. But these examples are only to provide a practical context for describing the inventive concepts detailed herein; these teachings may be utilized with other pairs of different RATs without departing from the principles set forth herein for ensuring appropriate security when a UE is moving between such networks operating with different RATs.

According to a first aspect of the present invention, there is provided a method for operating a user equipment (UE), the method comprising: determining that a valid authentication for the UE, generated with a radio network operating with a first radio access technology (RAT), is not a mutual authentication between the UE and the network operating with the first RAT; and in response, the UE unilaterally taking action to prevent the valid authentication that is not a mutual authentication from being used to authenticate with a radio network operating with a second RAT that utilizes mutual authentication.

According to a second aspect of the present invention, there is provided apparatus for operating a user equipment (UE), the apparatus comprising a processing system configured to cause the apparatus to at least: determine that a valid authentication for the UE, generated with a radio network operating with a first radio access technology (RAT), is not a mutual authentication between the UE and the network operating with the first RAT; and in response, to cause the UE to unilaterally take action to prevent the valid authentication that is not a mutual authentication from being used to authenticate with a radio network operating with a second RAT that utilizes mutual authentication.

According to a third aspect of the present invention, there is provided a computer program comprising a set of computer instructions comprising: code for determining that a valid authentication for the UE, generated with a radio network operating with a first radio access technology (RAT), is not a mutual authentication between the UE and the network operating with the first RAT; and code for, in response, causing the UE to unilaterally take action to prevent the valid authentication that is not a mutual authentication from being used to authenticate with a radio network operating with a second RAT that utilizes mutual authentication.

The processing system described above may comprise at least one processor and at least one memory including computer program code.

There may be provided a computer readable memory tangibly storing a set of computer instructions as described above.

Further features and advantages of the invention will become apparent from the following description of preferred embodiments of the invention, given by way of example only, which is made with reference to the accompanying drawings.

To explain the security "hole" that examples of these teachings address, first is a review of the security procedures for a few common RATs. The Universal Mobile Telecommunication System (UMTS) provides for an authentication procedure that results in the establishment of a UMTS security context, but unlike the GSM approach the UMTS procedure which utilizes AKA provides mutual authentication whereby the UE can also validate the network. The UMTS authentication procedure can be used also in the GSM/EDGE Radio Access network (GERAN) provided that a) the Serving GPRS (general packet radio service) Support Node (SGSN) supports it and b) the UE is equipped with a UMTS Subscriber Identity Module (USIM).

The E-UTRA or LTE system uses an evolved packet system (EPS) security, which roughly corresponds to the UMTS security context. More specifically, the EPS network access stratum (NAS) security context consists of a base key called the KASME (from which the actual security keys are derived) with the associated key set identifier, the UE security capabilities, and the uplink and downlink NAS COUNT values (NAS sequence numbers).

After an inter system (inter-RAT) change to a LTE network, a UE's EPS security context can be derived from an existing UMTS context for that UE, for example if an EPS security context does not exist for that UE (see section 10.1 of 3GPP TS 33.401 v12.6.0, December 2012 for further details). The mapped security context is created by converting the current security context in the source system (the existing UMTS context in this example) to a security context for the target system (LTE in this example) in inter-system mobility.

Since a subscriber, having access to a LTE network and having a USIM, is capable of using the UMTS authentication procedure, it follows that the LTE network should in general use the UMTS authentication challenge in its authentication procedure with this UE. That would result in the network being authenticated by the UE and the security keys which were used in GERAN or UTRAN can then be trusted and used in EUTRAN/LTE.

When interworking between E-UTRAN and GERAN is supported by a SGSN capable of handling UMTS security contexts, TS 33.102 and 33.401 as referenced above require the SGSN to ensure that the UE is authenticated using UMTS AKA, if in fact the UE supports UMTS AKA.

If in a UMTS to LTE changeover the Forward Relocation Request message indicates that the UE's security mode is GSM (that is, the mobility management context in that message contains a Kc key), the mobility management entity (MME) in the LTE network will abort the UE's call procedure so long as it is a non-emergency call. More generally, 3GPP TS 33.401 provides at section 9.1.2 that the MME shall abort any tracking area update (TAU) procedure that is not associated with an emergency call if the UE does not have the appropriate security context available.

In some network deployments, when the subscriber/UE moves from the GERAN network into a non-GERAN network, only GSM authentication procedures are utilized (see 3GPP TS 33.102 section 6.8.1.1.). One example of such a GERAN network deployment is a Release 98 visitor location register (VLR)/SGSN configuration.

As one example of the security context created above, consider the case in which a UE moves from a GSM network into an LTE network. There the network creates a mapped EPS security context. A problem arises in that mutual authentication is not performed (in this case mutual authentication is lacking because the UE does not authenticate the network). This lack of mutual authentication causes a security risk when operating in the LTE system, which assumes mutual authentication.

Another example of the security context created above is in some network configurations where a subscriber is attached to a GERAN network only. In this instance, GSM authentication procedures can be initiated. Following the authentication, when the UE performs intersystem changes to an E-UTRAN mobility management entity (MME) and starts a TRACKING AREA UPDATE (TAU) procedure, the network/MME should create an EPS NAS security context for the UE. If the UE is only capable of handling a GSM security context, the network should initiate appropriate security procedures or the network should detach the UE from the network in order to create a native EPS NAS security context. In this case, a mapped EPS security context should not be created from the GSM security context.

However, a network that is not implemented according to proper standards may sometimes create a mapped EPS security context for the UE. This can lead to a situation where the UE has an insufficient security context in E-UTRAN. Specifically, the UE will not have authenticated the E-UTRAN network it is currently using. This can create a severe security risk if the UE is unaware it is roaming in a "fraudulent" EPS network.

An exemplary embodiment of these teachings can be implemented when a UE moves from a GSM or GERAN network into an LTE network. There the UE can first check if it has only a GSM security context. In this case, the GSM security context alone should not be used in the LTE network due to the above mentioned security risks. Next, the UE will check if the last performed (or other currently-valid) authentication procedure was a GSM acknowledgment (AKA). If that is the case, then in one embodiment the UE indicates to the network in a TRACKING AREA UPDATE REQUEST that it does not have a valid security context. That request forces the new network (LTE in this case) to initiate an authentication procedure. Since the UE is now in an LTE network, the UE and the network will engage in mutual authentication and an EPS security context will be created.

In this exemplary embodiment, the UE should not immediately delete the previously established GSM security context which was not used with the LTE network, since it may be needed if the TAU procedure with the LTE network is aborted and the UE needs to return to a UTRAN or a GERAN. According to this embodiment the GSM security context should not be deleted before a response to TAU REQUEST is received or a new security context is established.

An alternative implementation is to delete the GSM security context immediately, perform a local detach and initiate a new EPS attach procedure. This will result in establishing a new EPS security context with the LTE network.

Another exemplary embodiment of these teachings is to disable LTE capability on the UE, so that the UE will not attempt any inter-RAT procedures in which the UE will attempt to move to an LTE network. The UE's LTE capability could be re-enabled on the UE once sufficient security context has been established through execution of UMTS AKA, for example when the UE moves from the GSM network to an interim network of a third RAT, such as for example a UTRAN, prior to attempting to establish with a LTE network.

Exemplary embodiments of these teachings can be implemented by modifying UE protocol software in such a manner so as to prevent a UE from moving into an LTE network without mutual authentication.

Another exemplary embodiment of these teachings may be implemented when a UE moves to an E-UTRAN network due to an intersystem change from A/Gb or Iu mode and sends a TAU request to the network. In this implementation the UE needs to remember that the ciphering key sequence number indicated in the TAU request is related to the GSM security context and not to the E-UTRAN security. If the E-UTRAN network initiates a NAS security mode control procedure after the TAU request and a SECURITY MODE COMMAND indicates "mapped security context" as the type of security context flag of the NAS key set identifier information element (IE), the UE in this instance shall detect that the KSI value was related to the GSM security context. This will inform the UE that the proper security context with the E-UTRAN has not occurred. The UE in response shall send a SECURITY MODE REJECT message to the E-UTRA network and abort the TAU procedure.

In this exemplary embodiment the UE will store ciphering key sequence numbers (for example CKSN=1) and the type of related security context (for example GSM or UMTS) in at least the mobile equipment memory or its universal integrated circuit card (UICC). This is the mechanism by which this embodiment prevents the network from creating a mapped security context from an inappropriate type of context when the UE undergoes an inter-system change to an E-UTRAN.

If the MME accepts the TAU request from the UE and the CKSN indicates a GSM security context, then the following implementation options with respect to the UE can occur: (1) the UE can abort the tracking area update procedure and not send TAU COMPLETE; (2) the UE can abort the procedure and re-initiate the TAU procedure; (3) the UE can initiate a detach procedure; or (4) the UE can select GERAN/UTRAN access technology or E-UTRAN access technology in a different public land mobile network (PLMN).

If the network sends a SECURITY MODE COMMAND message indicating a mapped context that correlates with the CKSN of a GSM security context is to be taken into use, in an embodiment the UE shall: (1) send a SECURITY MODE REJECT message to the network using either existing cause values or a new one; and (2) abort ongoing TAU procedures (and detach or re-attempt another TAU without detaching), or select a GERAN/UTRAN access technology or an E-UTRAN access technology in a different PLMN or a different E-UTRAN cell. The UE could optionally also update the appropriate list or lists of forbidden networks in order to black-list the "fraudulent" network. The UE could also store network information regarding the fraudulent network and inform the home operator of this information. This embodiment will prevent the UE from entering into an unsecure E-UTRAN network.

FIG. 1 presents a summary of the above teachings for operating a user equipment (UE) 20 such as for example one capable of operating in a GSM network, GERAN and/or UTRAN, and also in a LTE and/or LTE-Advanced (LTE-A) network. At block 102 the UE determines that a valid authentication for the UE, generated with a radio network operating with a first RAT, is not a mutual authentication between the UE and the network operating with the first RAT; and in response, the UE unilaterally takes action to prevent the valid authentication that is not a mutual authentication from being used to authenticate with a radio network operating with a second RAT that utilizes mutual authentication. Consistent with the above non-limiting examples, block 104 specifies that the second RAT is Evolved Universal Terrestrial Access Radio Access (E-UTRA) and the first RAT is other than E-UTRA, such as for example GSM or GERAN.

Some of the non-limiting implementations detailed above are also summarized at FIG. 1 following block 104. Block 106 relates that the action unilaterally taken by the UE comprises: including in a tracking area update TAU request, which the UE sends to the radio network operating with the second RAT, an indication that the UE does not have a valid security context, regardless of the valid authentication stated in block 102 that is not a mutual authentication.

Block 108 of FIG. 1 specifies that the action unilaterally taken by the UE is in response to the determining and further in response to the UE moving to the radio network operating with the second RAT. In this embodiment the action comprises: the UE deleting a security context associated with the valid authentication that is not a mutual authentication; and the UE initiating a new attach procedure with the radio network operating with the second RAT, which results in the UE establishing a new security context with the radio network operating with the second RAT. The UE may also in a more particular embodiment perform a (local) detach procedure to detach from the radio network operating with the first RAT, but whether or not the UE does detach the GSM/1st RAT security context would not be used in the new attach procedure.

At Block 110 the action unilaterally taken by the UE comprises: disabling capability of the UE to perform an inter-RAT procedure with radio networks operating with the second RAT. Block 112 gives a further embodiment after the disabling of block 110, namely that the UE utilizes an authentication and key agreement (AKA) procedure to establish a new security context with an interim radio network using an interim radio access technology such as for example a UTRAN; and in response to that new security context being established the UE automatically re-enables the capability of the UE to perform the inter-RAT procedure that was disabled in block 100 (inter-RAT with radio networks operating with the second RAT).

Certain exemplary embodiments provide additional and more particularized steps for performing the main actions summarized at FIG. 1. In one embodiment, determining that the valid authentication is not a mutual authentication comprises the UE tracking that a ciphering key sequence number, included in a tracking area update message that the UE sends to the radio network operating with a second RAT, is related to a security context used in the first RAT which does not represent a mutual authentication. In this embodiment, the unilateral actions by the UE are in response to the determining and are further in response to the UE receiving, from the radio network operating with a second RAT in response to the tracking area update message, a security mode command message having a security context flag set to indicate that the UE's security context is mapped. Once the UE sees that flag knowing its earlier (but still valid) authentication is not mutual, the UE takes its unilateral action which in this case comprises the UE sending a security mode reject message to the radio network operating with a second RAT. This reject message is sent in reply to the network's security mode command message with the security context flag.

In another detailed embodiment, determining that the valid authentication is not a mutual authentication as generally stated at block 102 of FIG. 1 comprises the UE tracking that a ciphering key sequence number, included in a tracking area update message that the UE sends to the radio network operating with a second RAT, is related to a security context used in the first RAT which does not represent a mutual authentication. In response to the determining and further in response to the UE receiving, from the radio network operating with a second RAT in response to the tracking area update message, a security mode command message, then the action unilaterally taken by the UE as stated generally at block 102 of FIG. 1 comprises the UE ignoring the received security mode command message. The result from both embodiments where the UE recognizes the security context flag in the security mode command message, whether the UE replies with a reject message or ignores the network's command message, is the same in that the security context in the new network (with the second RAT) is not established based on the older/valid but insufficient security context.

These steps summarized at FIG. 1 and immediately above may be executed by a UE, or by one or more components thereof such as a processor and a memory storing executable software code, or by a USIM, or by a modem, and so forth.

The logic diagram of FIG. 1 may be considered to illustrate the operation of examples of a method, and a result of execution of a computer program stored in a computer readable memory, and a specific manner in which components of an electronic device are configured to cause that electronic device to operate, whether such an electronic device is the UE or some other portable electronic device, or one or more components thereof such as a modem, chipset, or the like. The various blocks shown in FIG. 1 may also be considered as a plurality of coupled logic circuit elements constructed to carry out the associated function(s), or specific result of strings of computer program code or instructions stored in a memory.

Such blocks and the functions they represent are non-limiting examples, and may be practiced in various components such as integrated circuit chips and modules, and the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) or (ii) portions of processor(s)/software (including digital signal processor(s)), software, and memory(ies) that work together to cause an apparatus, such as a user equipment/UE, to perform the various functions summarized at FIG. 1 and (c) circuits, such as a microprocessor(s) or a portion of a microprocessor(s), that require software or firmware for operation, even if the software or firmware is not physically present. This definition of "circuitry" applies to all uses of this term in this specification, including in any claims. As a further example, as used in this specification, the term "circuitry" would also cover an implementation of merely a processor (or multiple processors) or portion of a processor and its (or their) accompanying software and/or firmware. The term "circuitry" also covers, for example, a baseband integrated circuit or application specific integrated circuit for a user equipment UE or a similar integrated circuit in another device that communicates wirelessly with the inter-RAT wireless networks and which operates according to these teachings.

Figure 2:
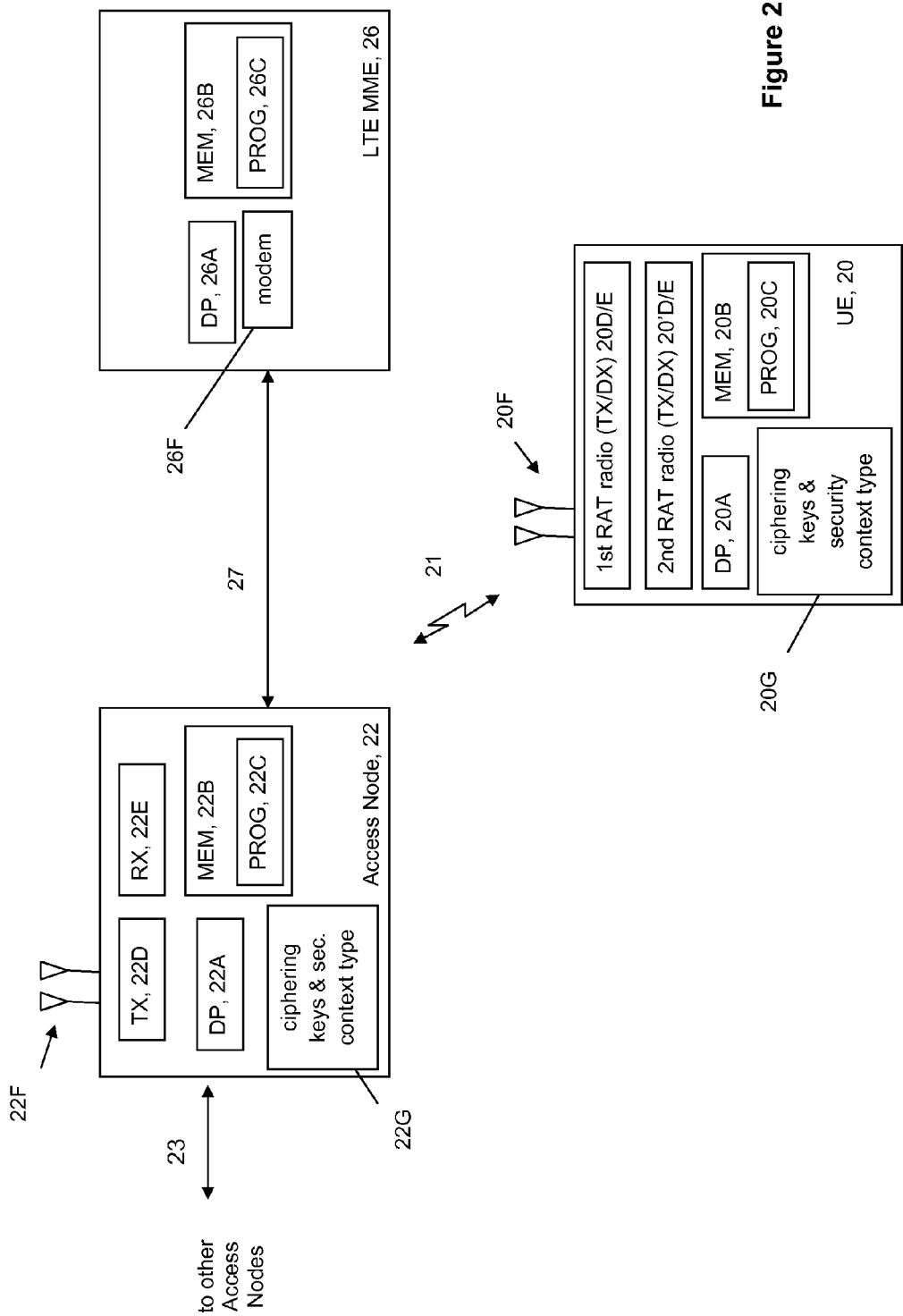
FIG. 2 is a simplified block diagram of an example of a UE in communication with an Access Node and a LTE MME illustrating exemplary electronic devices suitable for use in practicing the exemplary embodiments of this invention.

Reference is now made to FIG. 2 for illustrating a simplified block diagram of various electronic devices and apparatus that are suitable for use in practicing the exemplary embodiments of this invention. In FIG. 2 an Access Node 22 is adapted for communication over a wireless link 21 with an apparatus, such as a mobile terminal or UE 20. The Access Node 22 may be any access node such as a NodeB or an eNodeB (including frequency selective repeaters) of any wireless network, such as GSM, GERAN, UTRAN, E-UTRAN/LTE, WCDMA, and the like. The operator network of which the Access Node 22 is a part may also include a network control element such as a serving gateway SGW 24, or radio network controller RNC in the case of a UTRAN, either of which provides connectivity with the core cellular network and with further networks (e.g. a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, first communication means such as a transmitter TX 20D and a receiver RX 20E for bidirectional wireless communications with the Access Node 22 over the second RAT (for example, E-UTRAN), and a receiver RX 20E for bidirectional wireless communications with some other access node using the first RAT (for example, GSM). All of these wireless communications are via one or more antennas 20F. Also stored in the MEM 20B at reference number 20G are the ciphering key sequence numbers and the type of related security context according to exemplary embodiments above.

The Access Node 22 also includes processing means such as at least one data processor (DP) 22A, storing means such as at least one computer-readable memory (MEM) 22B storing at least one computer program (PROG) 22C, and communication means such as a transmitter TX 22D and a receiver RX 22E for bidirectional wireless communications with the UE 20 on the first RAT via one or more antennas 22F. The Access Node 22 stores at block 22G in certain embodiments its own ciphering key sequence numbers and the type of related security context for a specific UE.

Also at FIG. 2 is shown a LTE MME 26. The LTE MME 26 includes processing means such as at least one data processor (DP) 26A, storing means such as at least one computer-readable memory (MEM) 26B storing at least one computer program (PROG) 26C, and communication means such as a modem 26F for bidirectional wireless communications with the access node 22 and with other access nodes under its coordination.

While not particularly illustrated for the UE 20 or the Access Node 22, those devices are also assumed to include as part of their wireless communicating means a modem and/or a chipset which may or may not be inbuilt onto an RF front end chip within those devices 20, 22 and which also operates according to the respective first and second RATs as set forth above.

At least one of the PROGs 20C in the UE 20 is assumed to include a set of program instructions that, when executed by the associated DP 20A, enable the device to operate in accordance with the exemplary embodiments of this invention, as detailed above. The Access Node 22 also has software stored in its MEM 22B to implement certain aspects of these teachings. In these regards, the exemplary embodiments of this invention may be implemented at least in part by computer software stored on the MEM 20B, 22B which is executable by the DP 20A of the UE 20 and/or by the DP 22A of the Access Node 22, or by hardware, or by a combination of tangibly stored software and hardware (and tangibly stored firmware) in any one or more of these devices 20, 22. In this manner, the respective DP with the MEM and stored PROG may be considered a data processing system. Electronic devices implementing these aspects of the invention need not be the entire devices as depicted at FIG. 2 or may be one or more components of same such as the above described tangibly stored software, hardware, firmware and DP, or a system on a chip SOC or an application specific integrated circuit ASIC.

In general, the various embodiments of the UE 20 can include, but are not limited to, personal portable digital devices having wireless communication capabilities, including but not limited to cellular and other mobile phones, navigation devices, laptop/palmtop/tablet computers, digital cameras and music devices, and Internet appliances.

Various embodiments of the computer readable MEMs 20B, 22B, 26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A, 26A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the LTE/LTE-A (or UTRAN), GSM and GERAN systems, as noted above the exemplary embodiments of this invention are not limited for use with only these particular types of wireless radio access technology networks.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for operating a user equipment (UE), the method comprising:
    determining that a valid authentication for the UE, generated with a radio network operating with a first radio access technology (RAT), is not a mutual authentication between the UE and the network operating with the first RAT;
    and in response, the UE unilaterally taking action to prevent the valid authentication that is not a mutual authentication from being used to authenticate with a radio network operating with a second RAT that utilizes mutual authentication.

2. The method according to claim 1, in which the second RAT is Evolved Universal Terrestrial Access Radio Access (E-UTRA) and the first RAT is other than E-UTRA.

3. The method according to claim 1, in which the action unilaterally taken by the UE comprises including in a tracking area update request sent to the radio network operating with the second RAT an indication that the UE does not have a valid security context, regardless of the valid authentication that is not a mutual authentication.

4. The method according to claim 1, in which the action is unilaterally taken by the UE in response to the determining and further in response to the UE moving to the radio network operating with the second RAT, wherein the action comprises:
    the UE deleting a security context associated with the valid authentication that is not a mutual authentication;
    the UE performing a detach procedure to detach from the radio network operating with the first RAT; and
    the UE initiating a new attach procedure with the radio network operating with the second RAT which results in establishing a new security context with the radio network operating with the second RAT.

5. The method according to claim 1, in which the action unilaterally taken by the UE comprises:
    disabling capability of the UE to perform an inter-radio access technology (RAT) procedure with radio networks operating with the second RAT.

6. The method according to claim 5, the method comprising after the disabling:
    the UE utilizing an authentication and key agreement (AKA) procedure to establish a new security context with an interim radio network operating with a third RAT;
    and in response the UE automatically re-enabling the capability of the UE to perform the inter-radio access technology (RAT) procedure with radio networks operating with the second RAT.

7. The method according to claim 1, wherein:
    determining that the valid authentication is not a mutual authentication comprises the UE tracking that a ciphering key sequence number, included in a tracking area update message that the UE sends to the radio network operating with a second RAT, is related to a security context used in the first RAT which does not represent a mutual authentication; and
    in response to the determining and further to receiving, from the radio network operating with a second RAT in response to the tracking area update message, a security mode command message having a security context flag set to indicate that the UE's security context is mapped, the action unilaterally taken by the UE comprises the UE sending a security mode reject message to the radio network operating with a second RAT.

8. The method according to claim 1, wherein:
    determining that the valid authentication is not a mutual authentication comprises the UE tracking that a ciphering key sequence number, included in a tracking area update message that the UE sends to the radio network operating with a second RAT, is related to a security context used in the first RAT which does not represent a mutual authentication; and
    in response to the determining and further to receiving, from the radio network operating with a second RAT in response to the tracking area update message, a security mode command message, the action unilaterally taken by the UE comprises the UE ignoring the received security mode command message.

9. The method according to claim 1, in which the method is executed by the UE or by one or more components thereof.

10. An apparatus for operating a user equipment (UE), the apparatus comprising a processing system, the processing system comprising at least one processor and at least one memory storing computer program code, wherein the at least one processor with the at least one memory and the computer program code are configured to cause the apparatus at least to:
    determine that a valid authentication for the UE, generated with a radio network operating with a first radio access technology (RAT), is not a mutual authentication between the UE and the network operating with the first RAT;
    and in response, cause the UE to unilaterally take action to prevent the valid authentication that is not a mutual authentication from being used to authenticate with a radio network operating with a second RAT that utilizes mutual authentication.

11. The apparatus according to claim 10, in which the second RAT is Evolved Universal Terrestrial Access Radio Access (E-UTRA) and the first RAT is other than E-UTRA.

12. The apparatus according to claim 10, in which the action unilaterally taken by the UE comprises including in a tracking area update request sent to the radio network operating with the second RAT an indication that the UE does not have a valid security context, regardless of the valid authentication that is not a mutual authentication.

13. The apparatus according to claim 10, in which the action is unilaterally taken by the UE in response to the determining and further in response to the UE moving to the radio network operating with the second RAT, wherein the action comprises:
the UE deleting a security context associated with the valid authentication that is not a mutual authentication; and
the UE initiating a new attach procedure with the radio network operating with the second RAT which results in establishing a new security context with the radio network operating with the second RAT.

14. The apparatus according to claim 10, in which the action unilaterally taken by the UE comprises:
disabling capability of the UE to perform an inter-radio access technology (RAT) procedure with radio networks operating with the second RAT.

15. The apparatus according to claim 14, wherein the processing system is configured to cause the apparatus to cause the UE, after the disabling, to:
utilize an authentication and key agreement (AKA) procedure to establish a new security context with an interim radio network operating with a third RAT;
and in response automatically re-enable the capability of the UE to perform the inter-radio access technology (RAT) procedure with radio networks operating with the second RAT.

16. The apparatus according to claim 10, wherein:
determining that the valid authentication is not a mutual authentication comprises the UE tracking that a ciphering key sequence number, included in a tracking area update message that the UE sends to the radio network operating with a second RAT, is related to a security context used in the first RAT which does not represent a mutual authentication; and
in response to the determining and further to receiving, from the radio network operating with a second RAT in response to the tracking area update message, a security mode command message having a security context flag set to indicate that the UE's security context is mapped, the action unilaterally taken by the UE comprises the UE sending a security mode reject message to the radio network operating with a second RAT.

17. The apparatue according to claim 10, wherein:
determining that the valid authentication is not a mutual authentication comprises the UE tracking that a ciphering key sequence number, included in a tracking area update message that the UE sends to the radio network operating with a second RAT, is related to a security context used in the first RAT which does not represent a mutual authentication; and
in response to the determining and further to receiving, from the radio network operating with a second RAT in response to the tracking area update message, a security mode command message, the action unilaterally taken by the UE comprises the UE ignoring the received security mode command message.

18. A computer readable memory tangibly storing a set of computer instructions comprising code, comprising:
code for determining that a valid authentication for the UE, generated with a radio network operating with a first radio access technology (RAT), is not a mutual authentication between the UE and the network operating with the first RAT;
and code for, in response, causing the UE to unilaterally take action to prevent the valid authentication that is not a mutual authentication from being used to authenticate with a radio network operating with a second RAT that utilizes mutual authentication.

19. The computer readable memory according to claim 18, in which the second RAT is Evolved Universal Terrestrial Access Radio Access (E-UTRA) and the first RAT is other than E-UTRA.

20. The computer readable memory according to claim 18, in which the action unilaterally taken by the UE comprises including in a tracking area update request sent to the radio network operating with the second RAT an indication that the UE does not have a valid security context, regardless of the valid authentication that is not a mutual authentication.

\* \* \* \* \*